United States Patent
Garg et al.

(10) Patent No.: US 10,635,731 B2
(45) Date of Patent: Apr. 28, 2020

(54) SYSTEM FOR GENERATING AND EXECUTING EDITABLE MULTIPLE-STEP REQUESTS

(71) Applicant: Bank of America Corporation, Charlotte, NC (US)

(72) Inventors: Hanish Garg, Charlotte, NC (US); Ramesh Natarajan, Huntersville, NC (US); Pavan Kumar Kamisetty, Charlotte, NC (US); Rita J. Winborne, Charlotte, NC (US); Aaron Z. Chan, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 163 days.

(21) Appl. No.: 16/049,477

(22) Filed: Jul. 30, 2018

(65) Prior Publication Data

US 2020/0034485 A1 Jan. 30, 2020

(51) Int. Cl.

| G06F 16/951 | (2019.01) |
|---|---|
| G06Q 10/10 | (2012.01) |
| G06F 16/176 | (2019.01) |
| G06F 9/30 | (2018.01) |
| H04L 29/08 | (2006.01) |

(52) U.S. Cl.
CPC .......... *G06F 16/951* (2019.01); *G06F 9/3017* (2013.01); *G06F 16/176* (2019.01); *G06Q 10/10* (2013.01); *H04L 67/306* (2013.01); *H04L 67/322* (2013.01); *H04L 67/36* (2013.01)

(58) Field of Classification Search
CPC ...... G06F 16/176; G06F 16/951; G06Q 10/10
See application file for complete search history.

(56) References Cited

U.S. PATENT DOCUMENTS

| 9,773,051 | B2 * | 9/2017 | Smith | G06F 16/27 |
|---|---|---|---|---|
| 2003/0109938 | A1 * | 6/2003 | Daum | H04L 12/2803 |
|  |  |  |  | 700/11 |
| 2005/0086211 | A1 * | 4/2005 | Mayer | G06F 16/951 |
| 2010/0161720 | A1 * | 6/2010 | Colligan | G06Q 30/02 |
|  |  |  |  | 709/203 |
| 2011/0289011 | A1 * | 11/2011 | Hull | G06Q 10/107 |
|  |  |  |  | 705/319 |
| 2012/0210224 | A1 * | 8/2012 | Wong | H04N 21/25891 |
|  |  |  |  | 715/716 |
| 2014/0100835 | A1 * | 4/2014 | Majumdar | G06Q 10/047 |
|  |  |  |  | 703/11 |

(Continued)

*Primary Examiner* — Charles E Lu
(74) *Attorney, Agent, or Firm* — Michael A. Spring (57) ABSTRACT

A system for generating and executing a multiple-step request is disclosed. The disclosed system receives a request identifying a multiple-step request from a user. In response to the request, the system sends a series of queries to the user. Then, the system receives a series of responses identifying a plurality of inputs of the multiple-step request. Based on the series of queries and the series of responses, the system generates a series of instructions to perform the multiple-step request. Each instruction includes a command and at least one input. The input includes an editable field that allows the user to change the value of the input. The system records and stores each of the series of instructions as the multiple-step request. The system further stores the multiple-step request as a favorite request.

20 Claims, 5 Drawing Sheets

(56) References Cited

U.S. PATENT DOCUMENTS

| | | | |
|---|---|---|---|
| 2014/0249916 A1* | 9/2014 | Verhaeghe | G06Q 40/12 |
| | | | 705/14.51 |
| 2014/0358791 A1* | 12/2014 | Antao | G06Q 10/10 |
| | | | 705/44 |
| 2014/0370851 A1* | 12/2014 | Wang | G06Q 20/322 |
| | | | 455/411 |
| 2017/0301261 A1* | 10/2017 | Robitzkat | G06Q 10/06 |
| 2020/0004519 A1* | 1/2020 | Ryall | G06F 8/70 |
| 2020/0028815 A1* | 1/2020 | He | H04M 1/72552 |

* cited by examiner

SYSTEM FOR GENERATING AND EXECUTING EDITABLE MULTIPLE-STEP REQUESTS

TECHNICAL FIELD

This disclosure relates generally to processing requests, and more particularly to a system for generating and executing editable multiple-step requests.

BACKGROUND

Enterprises receive a significant number of web requests on a daily basis. The web requests usually require frequent access to the databases of the enterprises. For example, the web requests may include queries sent to the databases over a network. Sending numerous queries to the databases of the enterprises over the network consumes a significant amount of network bandwidth. This creates a significant strain on the network and may lead to network bottlenecks. Furthermore, frequently accessing the databases of the enterprise involves caching data elements that are stored in the databases. Frequently caching the data elements that are stored in the databases leads to a large amount of read and write operations on the memory space of the databases. This places a burden on the memory space of the databases, thereby reducing the processing speed of a computer system that implements the databases and degrading the performance of the computer system. It may also lead to the corruption of the memory space over time.

Existing systems may send batched requests (e.g., a macro that includes several instructions) instead of sending individual instructions to the databases to reduce the amount of web queries that are sent to the databases. However, these batched requests, such as the macros, are not editable. A new batched request including instructions that are only slightly different from the instructions of an existing macro, may cause a new macro to be created for the batched request. Creating the new macro involves sending new instructions over the network to the existing systems instead of using existing instructions. This consumes extra network bandwidth, therefore may create network bottlenecks or intensify existing network bottlenecks. Furthermore, creating the new macro involves performing more read and write operations on the memory space of the existing systems and using more memory space than using an existing macro. This places a burden on the memory space of the existing systems and thus degrades the performance of the computer system that implements the existing systems.

SUMMARY

Batched requests or instructions, such as macros, are usually not editable. Therefore, a new batched request including instructions that are only slightly different from the instructions of an existing macro cannot use the existing macro for executing the instructions. Instead, a new macro needs to be created for the new batched request. Creating the new macro involves sending new instructions over the network to the existing systems instead of using existing instructions. This consumes extra network bandwidth, and may create network bottlenecks or intensify existing network bottlenecks. Furthermore, creating the new macro involves performing more read and write operations on the memory space of a computer system that processes the macro and using more memory space than using an existing macro. This places a burden on the memory space of the computer system and thus degrades the performance of the computer system.

The present disclosure discloses a system to address the above-discussed network problems and memory burdens of the computer system. Specifically, the disclosed system discloses generating and executing editable multiple-step requests. A multiple-step request disclosed in the present disclosure includes a series of instructions comprising editable inputs. When executing the multiple-step request, any one of the inputs of the instructions can be modified for different needs. As opposed to existing systems, the disclosed system can reuse an existing multiple-step request if a new request requires modification to the inputs of the instructions of the existing multiple-step request. In this way, the disclosed system avoids creating a new multiple-step request that involves sending more web queries that can degrade network performance and memory space of computer systems. This approach reduces the number of web queries that are transmitted over the network. This facilitates reducing the strain on the network and alleviates the network bottlenecks. Furthermore, as opposed to creating new multiple-step requests, editing the existing multiple-step requests uses less memory space of the system and requires fewer read and write operations on the memory space, thereby reducing the burden on the memory space and improving the performance of the computers and the overall system.

In one embodiment, the disclosed system receives a request identifying a multiple-step request from a user. In response to the request, the system sends a series of queries to the user. The series of queries identifies a plurality of commands of the multiple-step request. Then, the system receives a series of responses identifying a plurality of inputs of the multiple-step request. Based on the series of queries and the series of responses, the system generates a series of instructions to perform the multiple-step request. Each instruction includes a command and at least one input. The input includes an editable field that allows the user to change the value of the input.

Next, the system records and stores each of the series of instructions as the multiple-step request. The system further receives a notification from the user indicating that the multiple-step request is a favorite request. In response to the notification, the system stores the multiple-step request as a favorite request.

Later, the system receives a request from the user to execute the favorite request. The system also receives a modification to the input of at least one instruction of the favorite request. In response to receiving the modification, the system applies the modification to the input of the at least one instruction. Then, the system executes the favorite request with the modification to the input of the at least one instruction.

The instructions of the multiple-step request include editable inputs. In this way, when the user wants to re-execute an existing multiple-step request but with some modification to the inputs, the existing multiple-step request can be reused. The disclosed system avoids creating a new multiple-step request that involves sending more web queries than using an existing multiple-step request. This approach reduces the number of web queries that are transmitted over the network. This facilitates reducing the strain on the network and alleviates the network bottlenecks. Furthermore, editing the existing multiple-step request uses less memory space of the system and requires fewer read and write operations on the memory space, thereby reducing burden on the memory space and improving the performance of the computer and the overall system. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
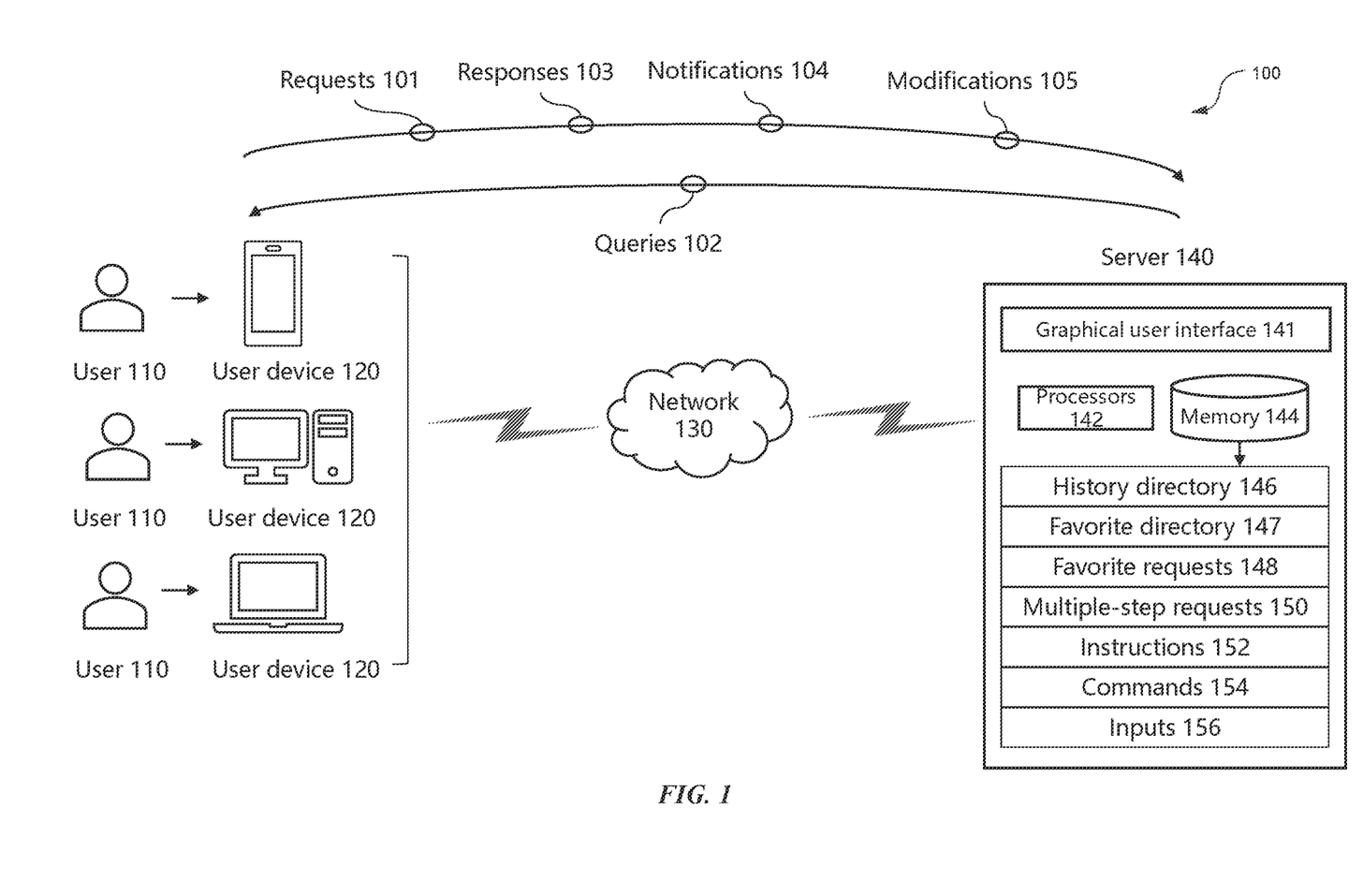
FIG. 1 illustrates an exemplary embodiment of a system for processing editable multiple-step requests, according to the present disclosure.

FIG. 1 illustrates an exemplary embodiment of a system 100 for processing editable multiple-step requests, according certain embodiments of the present disclosure. System 100 includes one or more user devices 120, a network 130, and a request processing server 140.

In general, system 100 can receive requests 101 from users 110 at server 140. Particular requests 101 can be designated as favorite requests 148 which means that users 110 may make modifications 105 to particular aspects of the requests 101 without having to generate new requests 101. This process is described in detail below.

The system 100 receives a request 101 identifying a multiple-step request 150 at the request processing server 140 from a user 110 that operates on a user device 120. In response to the request 101, the server 140 sends a series of queries 102 to the user 110 over the network 130. The series of queries 102 identify a set of commands 154 of the multiple-step request 150. Then, in response to the queries 102, the server 140 receives a series of responses 103 from the user 110 that identify a set of inputs 156 of the multiple-step request 150. Based on the series of queries 102 and the series of responses 103, the server 140 generates a series of instructions 152 to perform the multiple-step request 150. Each instruction 152 includes a command 154 and at least one input 156. The input 156 includes an editable field that allows the user 110 to change the value of the input 156.

Next, the server 140 records and stores each of the series of instructions 152 as the multiple-step request 150. The server 140 further receives a notification 104 from the user 110 indicating that the multiple-step request 150 is a favorite request 148. In response to the notification 104, the server 140 stores the multiple-step request 150 as a favorite request 148. Later, the server 140 receives another request 101 from the user 110 to execute the favorite request 148. The server 140 also receives a modification 105 to the input 156 of at least one instruction 152 of the favorite request 148. In response to receiving the modification 105, the server 140 applies the modification 105 to the input 156 of the at least one instruction 152. Then, the server 140 executes the favorite request 148 with the modification 105 to the input 156 of the at least one instruction 152.

Users 110 comprise any suitable users including businesses or other commercial organizations, government agencies, and/or individuals. Users 110 may operate on one or more user devices 120 to access system 100.

User devices 120 comprise any suitable devices or machines configured to communicate with other network devices in the system 100. Typically, user device 120 is a data processing system comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of user devices 120 include, but are not limited to, desktop computers, mobile phones, tablet computers, and laptop computers.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Request processing server 140 is a special purpose computer to process editable multiple-step requests 150. Specifically, request processing server 140 is configured to generate and execute editable multiple-step requests 150 as discussed below in greater detail with reference to FIGS. 2-5. In some embodiments, request processing server 140 comprises a graphical user interface (GUI) 141, one or more processors 142, and a memory 144.

GUI 141 is generally operable to tailor and filter data entered by and presented to users 110. GUI 141 may comprise a plurality of displays having interactive fields, pulldown lists, and buttons operated by users 110. GUI 141 may include a plurality of groupings and boundaries. It should be understood that the term GUI 141 may be used in the singular or in the plural to describe one or more GUIs 141 and each of the displays of a particular GUI 141.

Processor 142 described in the present disclosure may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 142 may be a programmable logic device, a microcontroller, a microprocessor, or any suitable combination of the preceding. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

Memory 144 described in the present disclosure may comprise any device operable to store, either permanently or temporarily, data, operational software, or other information for a processor. In some embodiments, the memory 144 comprises one or more disks, tape drives, or solid-state drives, and may be used as an over-flow data storage device, to store programs when such programs are selected for execution, and to store instructions and data that are read during program execution. The memory 144 may comprise any one or a combination of volatile or non-volatile local or remote devices suitable for storing information. For example, the memory 144 may comprise random access memory (RAM), read only memory (ROM), magnetic storage devices, optical storage devices, semiconductor storage devices, or any other suitable information storage device or a combination of these devices.

As illustrated in FIG. 1, memory 144 is configured to store a history directory 146 identifying multiple-step requests 150, a favorite directory 147 identifying favorite requests 148, a plurality of favorite requests 148, a plurality of multiple-step requests 150, instructions 152 of the multiple-step requests 150, and commands 154 and inputs 156 of the instructions 152. The history directory 146 identifies the multiple-step requests 148 that are previously executed by the system 100. The favorite directory 147 identifies the favorite requests 148 that are the multiple-step requests 150 saved as favorites.

Figure 2:
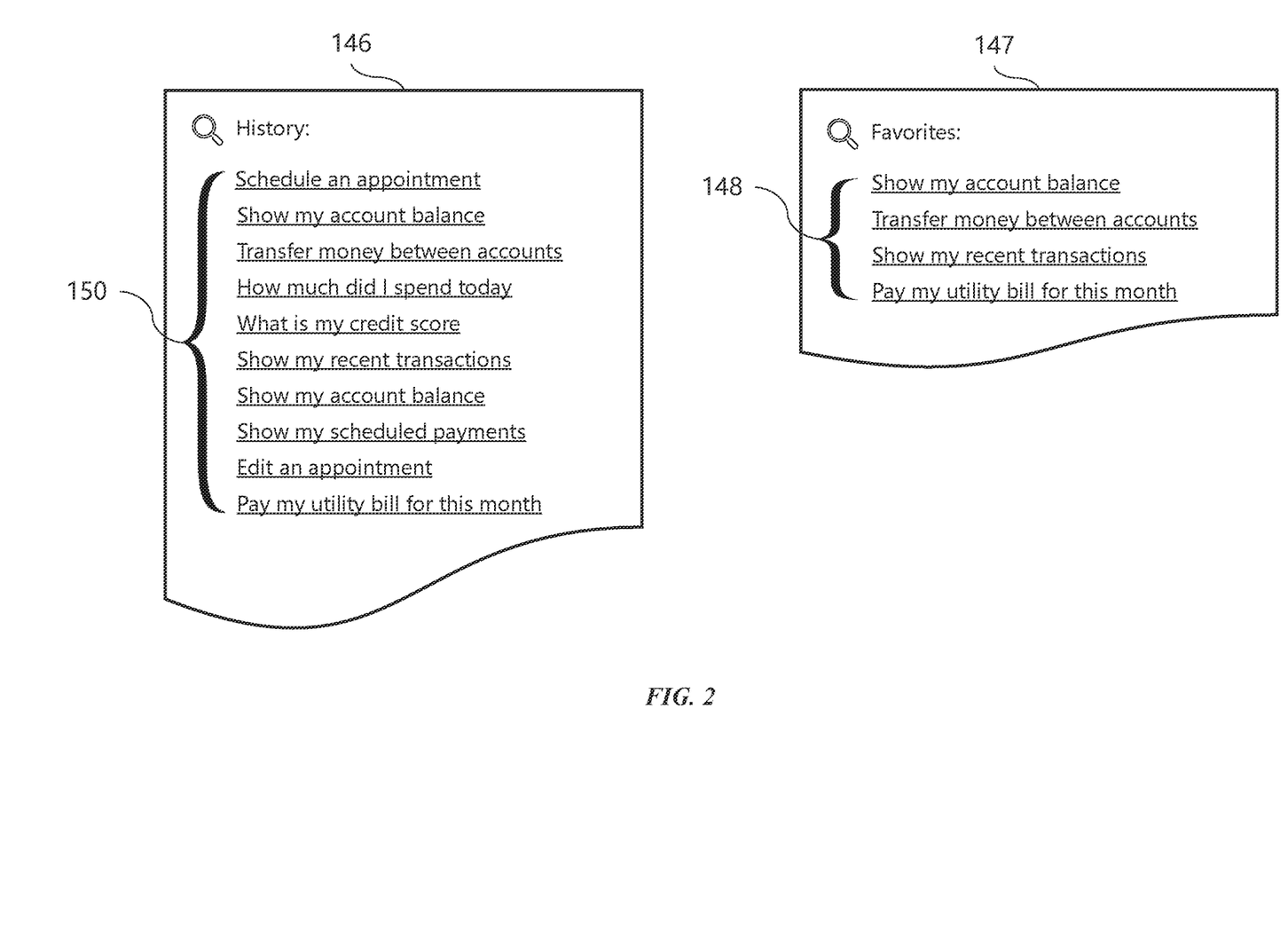
FIG. 2 illustrates an exemplary embodiment of a history directory and a favorite directory, according to the present disclosure.
Figure 4:
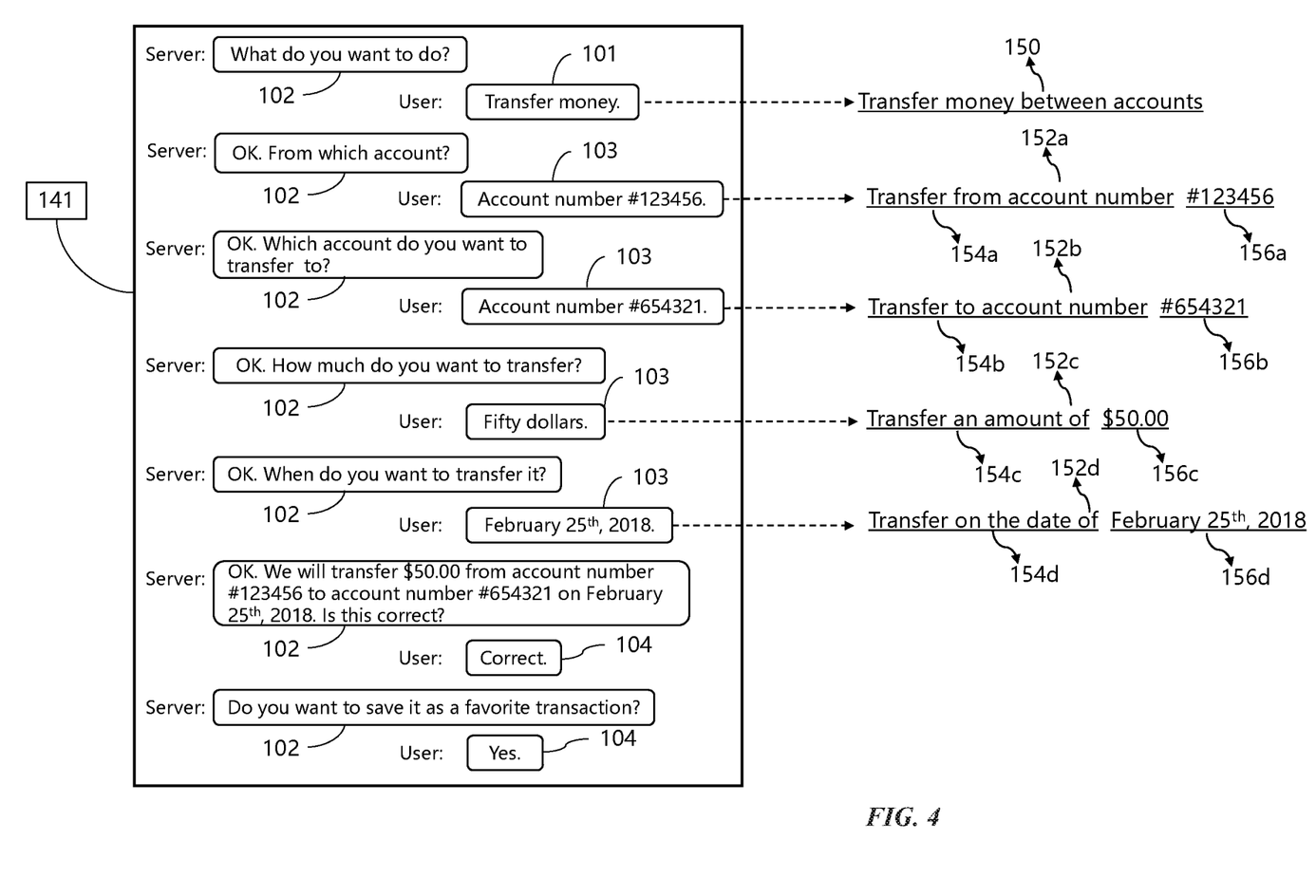
FIG. 4 illustrates an exemplary embodiment of generating an editable multiple-step request, according to the present disclosure.

FIG. 2 illustrates a history directory 146 identifying a set of example multiple-step requests 148, and a favorite directory 147 identifying a set of example favorite requests 148. Like a multiple-step request 150, a favorite request 148 also includes instructions 152 comprising commands 154 and inputs 156. Referring to FIG. 4, a multiple-step request 150 may include several instructions 152, and each of the instructions 152 includes a command 154 and an input 156. For example, as illustrated, the multiple-step request 150 "transfer money between accounts" includes four instructions 152a-d. A first instruction 152a of the multiple-step request 150 include a first command 154a "transfer from account number" and a first input 156a "#123456." A second instruction 152b of the multiple-step request 150 include a second command 154b "transfer to account number" and a second input 156b "#654321." A third instruction 152c of the multiple-step request 150 include a third command 154c "transfer an amount of" and a third input 156c "$50.00." A fourth instruction 152d of the multiple-step request 150 include a fourth command 154d "transfer on the date of" and a fourth input 156d "Feb. 25, 2018." The generation of the instructions 152a-d will be discussed below in greater detail with reference to FIG. 3.

Figure 3:
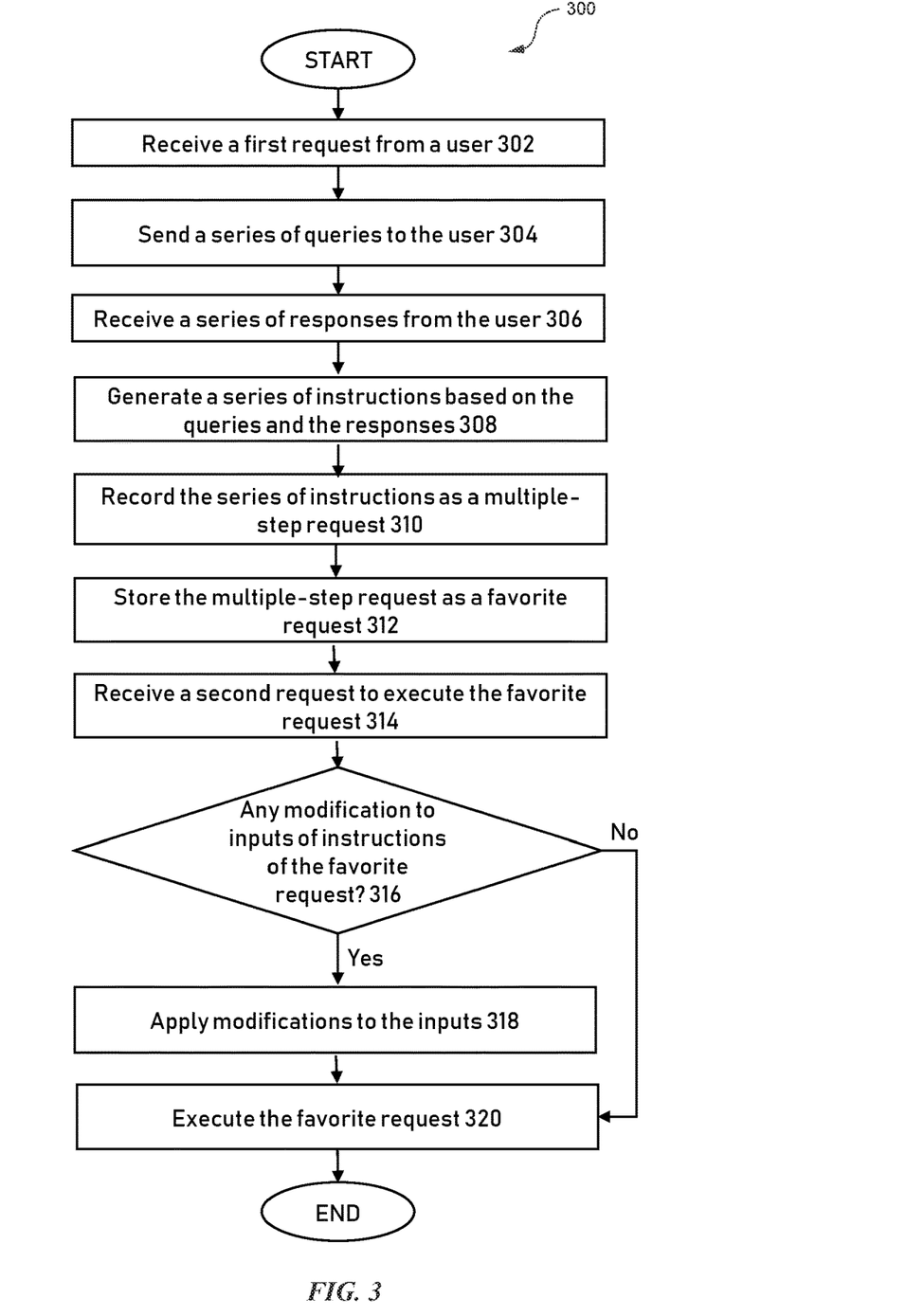
FIG. 3 illustrates a flow chart presenting an exemplary embodiment of a method of processing editable multiple-step requests, according to the present disclosure.

As noted before, the request processing server 140 is configured to generate and execute editable multiple-step requests 150. FIG. 3 illustrates a flow chart presenting an exemplary embodiment of a method 300 of generating and executing the editable multiple-step requests 150. The following is a non-limiting example that illustrate how the request processing server 140 of system 100 implements method 300.

Upon starting the process, the request processing server 140 receives a request 101 from a user 110 that operate on a user device 120 (step 302). The request 101 may be a text request or a voice request. In some embodiments, the system 100 may use a natural language processing technique to understand the meaning of a voice request. The request 101 may identify a multiple-step request 150. For example, referring to FIG. 4, the user 110 may start an application that is implemented by the disclosed system 100 and the server 140 may provide a GUI 141 to the user 110 and send a query 102 via the GUI 141 to the user 110 asking what the user 110 would like to do. In response to the query 102, the user 110 may reply with a response 103 including a request 101, such as for example, "transfer money." The request 101 "transfer money" identifies a multiple-step request 150 "transfer money between accounts" that involves multiple sub-requests or sub-operations, such as for example, identifying an account to transfer the money from, identifying an account to transfer the money to, determining an amount of the money to transfer, and determining a date to perform the money transfer. Each of the sub-requests or sub-operations is an instruction 152 of the multiple-step request 150.

At step 304, the request processing server 140 sends a series of queries 102 to the user 110. The series of queries 102 identifies a set of commands 154 of the multiple-step request 150. For example, as illustrated in FIG. 4, server 140 sends a query 102 asking the user 110 which account to transfer the money from. The query 102 "From which account?" is associated with a command 154 "transfer from account number." The server 140 may generate the command 154 based on the query 102. Note that the command 154 will be paired with an input 156 to generate an instruction 152 of the multiple-step request 150. For example, the command 154 "transfer from account number," when paired with an input 156 of an account number, for example such as, "#123456," generates an instruction 152 "transfer from account number #123456." The server 140 may send a series of queries 102 to the user 110 and await the responses 103 from the user 110 to generate the instructions 152 of the multiple-step request 150.

Referring back to FIG. 3, at step 306, the request processing server 140 receives a series of responses 103 from the user 110 in response to the series of queries 102. The series of responses 103 identifies a set of inputs 156 of the multiple-step request 150. For example, referring to FIG. 4, server 140 receives a response 103 "Account number #123456" in response to the query 102 "From which account?" The response 103 "Account number #123456" identifies an input 156 "#123456" for the command 154 "transfer from account number" that is identified by the query "From which account?" The server 140 may receive a series of responses 103 that identify the inputs 156 for the commands 154 that are identified by the series of queries 102 previously sent by the server 140.

Referring back to FIG. 3, at step 308, the server 140 generates a series of instructions 152 based on the series of queries 102 and the series of responses 103. Specifically, the server 140 may generate a command 154 based on a query 102 that is sent to the user 110. The server 140 may generate an input 156 based on a response 103 to the query 102. The server 140 then pairs the command 154 with the input 156 to generate an instruction 152. For example, referring to FIG. 4, server 140 sends the query 102 "From which account?" to the user 110 and generates the command 154

"transfer from account number" based on the query 102. In response to the query 102, the server 140 receives the response 103 "#123456" from the user 110 and generate the input 156 "#123456" based on the response 103. Then, the server 140 pairs the command 154 "transfer from account number" with the input 156 "#123456" to generate the instruction 152 "transfer from account number #123456."

Similarly, the server 140 generates the commands 154 from other queries 102 and the inputs 156 from other responses 103. For example, the server 140 generates the command 154 "transfer to account number" based on the query 102 "Which account do you want to transfer from?" and generates the input 156 "#654321" based on the response 103 "Account number #654321." The server 140 further generates the command 154 "transfer an amount of" based on the query 102 "How much do you want to transfer?" and generates the input 156 "$50.00" based on the response 103 "Fifty dollars." The server 140 further generates the command 154 "transfer on the date of" based on the query 102 "when do you want to transfer it?" and generates the input 156 "Feb. 25, 2018" based on the response 103 "Feb. 25, 2018."

Based on the generated commands 154 and inputs 156, the server 140 generates other instructions 152. For example, the server 140 generates another instruction 152 "transfer to account number #654321" by pairing the command 154 "transfer to account number" with the input 156 "#654321." The server 140 further generates the instruction 152 "transfer an amount of $50.00" by pairing the command 154 "transfer an amount of" with the input 156 "$50.00." The server 140 further generates the instruction 152 "transfer on the date of Feb. 25, 2018" by pairing the command 154 "transfer on the date of" with the input 156 "Feb. 25, 2018."

The inputs 156 of the instructions 152 are editable which allows the system 100 to change the values of the inputs 156. For example, the system 100 may change the input 156 "$50.00" that is paired with the command 154 "transfer an amount of" to a new input 156 "$100.00." This allows the system 100 to reuse existing instructions 152 instead of creating new instructions 152. Editing and reusing the existing instructions uses less memory space of the system 100 and requires fewer read and write operations on the memory space than creating new instructions 152, thereby reducing burden on memory 144 and improving the performance of the system 100. Fewer read and write operations on memory 144 also preserves memory from degradation over time thereby improving performance.

Referring back to FIG. 3, the method 300 proceeds to step 310 where the series of instruction 152 as generated at step 308 are recorded as a multiple-step request 150. For example, the server 140 may store each of the series of instructions 152 in the memory 144. After the server 140 receives the responses 103 from the user 110 to the queries 102 and generates the series of instructions 152, the server 140 may determine that all information for performing the multiple-step request 150 has been obtained. Referring to FIG. 4, the server 140 may further generate a query 102 (e.g., "We will transfer $50.00 from account number #123456 to account number #654321 on Feb. 25, 2018. Is this correct?") identifying the multiple-step request 150 and send the query 102 to the user 110 for confirming whether the information in the multiple-step request 150 is correct. In response to the query 102, the server 140 may receive a notification 104 from the user 110 indicating that the information for the multiple-step request 150 is correct. In response to the notification 104, the server 140 determines that the multiple-step request 150 is complete and executes the multiple-step request 150 by executing the series of instructions 152. The server 140 further stores the series of instructions 152 as the multiple-step request 150 by associating the series of instructions 152 with the multiple-step request 150.

As such, the multiple-step request 150 disclosed in the present disclosure includes a series of instructions 152 comprising editable inputs 156. When executing the multiple-step request 150, any one of the inputs 156 of the instructions 152 can be modified for different needs. The disclosed system 100 can reuse an existing multiple-step request 150 if a new request 101 requires modification 105 to the inputs 156 of the instructions 152 of the existing multiple-step request 150. In this way, the disclosed system 100 avoids creating a new multiple-step request 150 that involves sending additional web queries than using an existing multiple-step request 150. This approach reduces the number of communications and date that are transmitted over the network 130 in the form of queries 102 and responses 103. This facilitates reducing the strain on the network 130 and alleviates network bottlenecks.

Referring back to FIG. 3, at step 312, the request processing server 140 stores the multiple-step request 150 as a favorite. For example, referring to FIG. 4, the server 140 sends a query 102 asking whether the user 110 wants to save the multiple-step request 150 as a favorite. In response to the query 102, the server 140 receive a notification 104 from the user 110 indicating that the user 110 wants to save the multiple-step request 150 as a favorite. In response to the notification 104, the server 140 may store the instructions 152 of the multiple-step request 150 in the favorite directory 147 and associate the instructions 152 with a favorite request 148. The favorite request 148 includes the series of instructions 152 of the multiple-step request 150, but may have a name/identifier that is the same as or different from the multiple-step request 150.

Referring back to FIG. 3, at step 314, the request processing server 140 receives a request 101 to execute the favorite request 148 as generated at step 312. For example, referring to FIG. 5, the user 110 may open the favorite directory 147 on the GUI 141 and tap on one of the favorite requests 148. For example, the user 110 may tap on the favorite request 148 "transfer money between accounts." In response to the tapping, the server 140 may display the relevant information of the favorite request 148. For example, the server 140 may show the inputs 156 of the instructions 152 of the favorite request 148 on the GUI 141 to the user 110. Note that the inputs 156 of the instructions 152 are editable which allows the user 110 to change the values of the inputs 156. For example, the user 110 may long press one of the inputs 156 on the GUI 141 and change the value of the input 156.

Figure 5:
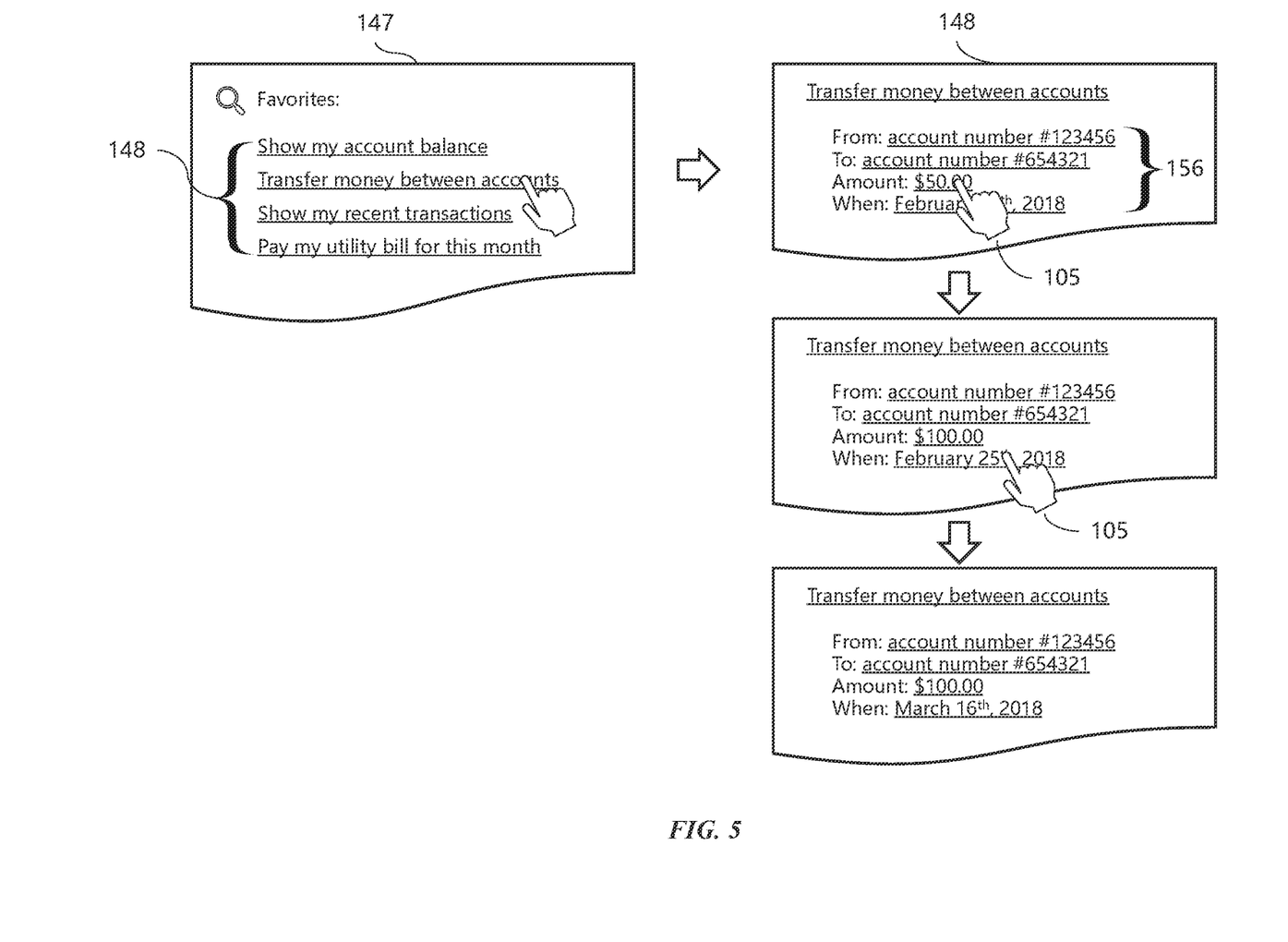
FIG. 5 illustrates an exemplary embodiment of editing an editable multiple-step request, according to the present disclosure.

Referring back to FIG. 3, at step 316, the request processing server 140 determines whether there is any modification 105 to the inputs 156 of the instructions 152 of the favorite request 148. For example, the user 110 may send an indication of a modification 105 to one of the inputs 156 to the server 140 by long pressing on the input 156 and changing the value of the input 156. Referring to FIG. 5, the user 110 may long press on the input 156 "$50.00" and change the value of the input 156 to "$100.00." The user 110 may long press on the input 156 "Feb. 25, 2018" and change the value of the input 156 to "Mar. 16, 2018."

Referring back to FIG. 3, if the server 140 determines a modification 105 is received from the user 110, method 300 proceeds to step 318. If the server 140 determines no modification 105 is received from the user 110, method 300 proceeds to step 320.

At step 318, the server 140 applies the modification 105 to the inputs 156 of the instructions 152 of the favorite request 148 in response to determining that the modification 105 is received from the user 110. For example, referring to FIG. 5, after applying the modification 105, the instructions 152 of the favorite request 148 "transfer money between account" now have a new set of inputs 156 including "account number #123456," "account number #654321," "$100.00," and "Mar. 16, 2018" for the commands 154 including "transfer from account number," "transfer to account number," "transfer an amount of," and "transfer on the date of," as described in FIG. 4. Now, the favorite request 148 "transfer money between account" has been modified to request transferring $100.00 from account number #123456 to account number #654321 on Mar. 16, 2018.

Referring back to FIG. 3, at step 320, the server 140 executes the favorite request 148 with the applied modification to the inputs 156 of the instructions 152 of the favorite request 148 if the server 140 received and applied the modification to the inputs 156. If the server does not receive any modification 105 from the user 110, the server 140 executes the favorite request 148 with the original instructions 152.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for generating and executing a multiple-step request, comprising:
   one or more processors configured to:
      receive, from a user, a first request, the first request identifying a first multiple-step request;
      in response to the first request, send, to the user, a first series of queries identifying a plurality of commands of the first multiple-step request;
      receive, from the user, a first series of responses identifying a plurality of inputs of the first multiple-step request;
      generate a first series of instructions to perform the first multiple-step request based on the first series of queries and the first series of responses, each instruction comprising a command and at least one input;
      record each of the first series of instructions;
      in response to receiving a first notification from the user indicating that the first multiple-step request is complete, store the first series of instructions as the first multiple-step request; and
      in response to receiving a second notification from the user indicating that the first multiple-step request is a favorite request, store the first multiple-step request as a first favorite request;
   a memory configured to store a list of favorite requests, each of the list of favorite requests comprising a multiple-step request, the list of favorite requests comprising at least the first favorite request;
   the one or more processors further configured to:
      receive, from the user, a second request to execute the first favorite request; and
      retrieve, from the memory, the first favorite request comprising the first series of instructions;
   a graphical user interface configured to:
      receive, from the user, a modification to the input of at least one instruction of the first favorite request; and
   the one or more processors further configured to:
      in response to receiving the modification to the input of the at least one instruction of the first favorite request, apply the modification to the input of the at least one instruction; and
      execute the first favorite request with the modification to the input of the at least one instruction.

2. The system of claim 1, wherein the first request comprises a text request or a voice request.

3. The system of claim 1, wherein the input comprises an entity name, an account number, or a money amount.

4. The system of claim 1, wherein storing the first series of instructions as the first multiple-step request comprising associating the first series of instructions with the first multiple-step request.

5. The system of claim 1, wherein storing the first multiple-step request as a first favorite request comprises:
   identifying the first series of instructions of the first multiple-step request; and
   associating the first series of instructions with the first favorite request.

6. The system of claim 1, wherein executing the first favorite request with the modification to the input of the at least one instruction comprises executing the first series of instructions of the first favorite request with the modification to the input of the at least one instruction.

7. The system of claim 1, wherein receiving, from the user, a modification to the input of the at least one instruction of the first favorite request comprises:
   displaying, to the user, the inputs of the first series of instructions of the first favorite request;
   receiving, from the user, a long press on the input of the at least one instruction of the first favorite request; and
   receiving, from the user, a change to the input of the at least one instruction of the first favorite request.

8. A non-transitory computer-readable medium comprising a logic for generating and executing a multiple-step request, the logic, when executed by one or more processors, instructing the one or more processors to:
   receive, from a user, a first request, the first request identifying a first multiple-step request;

in response to the first request, send, to the user, a first series of queries identifying a plurality of commands of the first multiple-step request;

receive, from the user, a first series of responses identifying a plurality of inputs of the first multiple-step request;

generate a first series of instructions to perform the first multiple-step request based on the first series of queries and the first series of responses, each instruction comprising a command and at least one input;

record each of the first series of instructions;

in response to receiving a first notification from the user indicating that the first multiple-step request is complete, store the first series of instructions as the first multiple-step request;

in response to receiving a second notification from the user indicating that the first multiple-step request is a favorite request, store the first multiple-step request as a first favorite request;

receive, from the user, a second request to execute the first favorite request;

retrieve the first favorite request comprising the first series of instructions;

receive, from the user, a modification to the input of at least one instruction of the first favorite request;

in response to receiving the modification to the input of the at least one instruction of the first favorite request, apply the modification to the input of the at least one instruction; and execute the first favorite request with the modification to the input of the at least one instruction.

9. The non-transitory computer-readable medium of claim 8, wherein the first request comprises a text request or a voice request.

10. The non-transitory computer-readable medium of claim 8, wherein the input comprises an entity name, an account number, or a money amount.

11. The non-transitory computer-readable medium of claim 8, wherein storing the first series of instructions as the first multiple-step request comprising associating the first series of instructions with the first multiple-step request.

12. The non-transitory computer-readable medium of claim 8, wherein storing the first multiple-step request as a first favorite request comprises:
identifying the first series of instructions of the first multiple-step request; and
associating the first series of instructions with the first favorite request.

13. The non-transitory computer-readable medium of claim 8, wherein executing the first favorite request with the modification to the input of the at least one instruction comprises executing the first series of instructions of the first favorite request with the modification to the input of the at least one instruction.

14. The non-transitory computer-readable medium of claim 8, wherein receiving, from the user, a modification to the input of the at least one instruction of the first favorite request comprises:
displaying, to the user, the inputs of the first series of instructions of the first favorite request;
receiving, from the user, a long press on the input of the at least one instruction of the first favorite request; and
receiving, from the user, a change to the input of the at least one instruction of the first favorite request.

15. A method for generating and executing a multiple-step request, comprising:
receiving, from a user, a first request, the first request identifying a first multiple-step request;
in response to the first request, sending, to the user, a first series of queries identifying a plurality of commands of the first multiple-step request;
receiving, from the user, a first series of responses identifying a plurality of inputs of the first multiple-step request;
generating a first series of instructions to perform the first multiple-step request based on the first series of queries and the first series of responses, each instruction comprising a command and at least one input;
recording each of the first series of instructions;
in response to receiving a first notification from the user indicating that the first multiple-step request is complete, storing the first series of instructions as the first multiple-step request;
in response to receiving a second notification from the user indicating that the first multiple-step request is a favorite request, storing the first multiple-step request as a first favorite request;
receiving, from the user, a second request to execute the first favorite request;
retrieving the first favorite request comprising the first series of instructions;
receiving, from the user, a modification to the input of at least one instruction of the first favorite request;
in response to receiving the modification to the input of the at least one instruction of the first favorite request, applying the modification to the input of the at least one instruction; and
executing the first favorite request with the modification to the input of the at least one instruction.

16. The method of claim 15, wherein the first request comprises a text request or a voice request.

17. The method of claim 15, wherein storing the first series of instructions as the first multiple-step request comprising associating the first series of instructions with the first multiple-step request.

18. The method of claim 15, wherein storing the first multiple-step request as a first favorite request comprises:
identifying the first series of instructions of the first multiple-step request; and
associating the first series of instructions with the first favorite request.

19. The method of claim 15, wherein executing the first favorite request with the modification to the input of the at least one instruction comprises executing the first series of instructions of the first favorite request with the modification to the input of the at least one instruction.

20. The method of claim 15, wherein receiving, from the user, a modification to the input of the at least one instruction of the first favorite request comprises:
displaying, to the user, the inputs of the first series of instructions of the first favorite request;
receiving, from the user, a long press on the input of the at least one instruction of the first favorite request; and
receiving, from the user, a change to the input of the at least one instruction of the first favorite request.

* * * * *